(12) United States Patent
Jackson

(10) Patent No.: US 11,907,904 B2
(45) Date of Patent: Feb. 20, 2024

(54) SYSTEMS AND METHODS FOR INTELLIGENT FORMS AUTOMATION

(71) Applicant: OPEN TEXT CORPORATION, Waterlo (CA)

(72) Inventor: Mark Nicholas Jackson, Kitchener (CA)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

(21) Appl. No.: 16/858,171

(22) Filed: Apr. 24, 2020

(65) Prior Publication Data

US 2020/0342404 A1 Oct. 29, 2020

Related U.S. Application Data

(60) Provisional application No. 62/839,306, filed on Apr. 26, 2019.

(51) Int. Cl.

| | |
|---|---|
| *G06Q 10/10* | (2023.01) |
| *G06Q 10/067* | (2023.01) |
| *G06Q 30/016* | (2023.01) |
| *G06F 16/958* | (2019.01) |
| *H04L 9/40* | (2022.01) |
| *G06F 40/186* | (2020.01) |
| *G06F 16/25* | (2019.01) |
| *G06F 3/04847* | (2022.01) |
| *G06F 3/0482* | (2013.01) |

(52) U.S. Cl.
CPC ......... *G06Q 10/10* (2013.01); *G06F 16/254* (2019.01); *G06F 16/958* (2019.01); *G06F 40/186* (2020.01); *G06Q 10/067* (2013.01); *G06Q 30/016* (2013.01); *H04L 63/102* (2013.01); *G06F 3/0482* (2013.01); *G06F 3/04847* (2013.01)

(58) Field of Classification Search
None
See application file for complete search history.

(56) References Cited

U.S. PATENT DOCUMENTS

| 8,543,503 | B1 * | 9/2013 | Harris | G06Q 30/04 |
| | | | | 705/40 |
| 10,657,369 | B1 * | 5/2020 | Chang | G06V 30/418 |
| 2001/0011283 | A1 * | 8/2001 | Kato | G06F 16/40 |
| | | | | 715/255 |

(Continued)

*Primary Examiner* — Howard Cortes
(74) *Attorney, Agent, or Firm* — Sprinkle IP Law Group

(57) ABSTRACT

Disclosed is a new intelligent forms automation solution for receiving a request or submission involving multiple types of non-native forms in a consistent manner. An engine locates a field in a non-native form, extracts a globally unique identifier (GUID) from the field and form data from data fields of the non-native form. The GUID is used by the engine to identify and retrieve a virtual copy of a native form identified. The engine fills the virtual copy of the native form with form data from the non-native form. Since the native form can have an associated workflow process, the form data from the non-native form is processed through the workflow. The native form and the non-native form can be created independently of one another. In some cases, a native form can be used to create a non-native form with a hidden field containing the GUID of the native form.

20 Claims, 19 Drawing Sheets

(56) References Cited

U.S. PATENT DOCUMENTS

| | | | |
|---|---|---|---|
| 2005/0004885 A1* | 1/2005 | Pandian | G06F 16/25 |
| 2012/0050548 A1* | 3/2012 | Ramachandrula | G06F 16/958 |
| | | | 348/207.1 |
| 2012/0089659 A1* | 4/2012 | Halevi | G06F 3/04842 |
| | | | 709/201 |
| 2014/0129914 A1* | 5/2014 | Agarwal | G06F 40/174 |
| | | | 715/226 |
| 2014/0188756 A1* | 7/2014 | Ponnavaikko | G06Q 10/10 |
| | | | 705/342 |
| 2014/0237342 A1* | 8/2014 | King | G06F 16/955 |
| | | | 715/224 |
| 2014/0244456 A1* | 8/2014 | Huang | G06Q 40/123 |
| | | | 705/31 |
| 2015/0205777 A1* | 7/2015 | Campanelli | G06K 9/00449 |
| | | | 715/226 |
| 2015/0248391 A1* | 9/2015 | Watanabe | G06F 16/9554 |
| | | | 715/226 |
| 2016/0012030 A1* | 1/2016 | Tran | G06F 40/174 |
| | | | 715/222 |
| 2016/0253303 A1* | 9/2016 | Pennington | G06V 30/40 |
| | | | 715/226 |
| 2017/0337172 A1* | 11/2017 | Dunn | G06F 40/174 |
| 2018/0060291 A1* | 3/2018 | Giffard-Burley | G06F 3/04883 |
| 2018/0081860 A1* | 3/2018 | Nishida | G06F 40/151 |
| 2018/0101525 A1* | 4/2018 | Hirata | G06F 16/958 |
| 2020/0026970 A1* | 1/2020 | Berseth | G06V 30/2455 |

\* cited by examiner

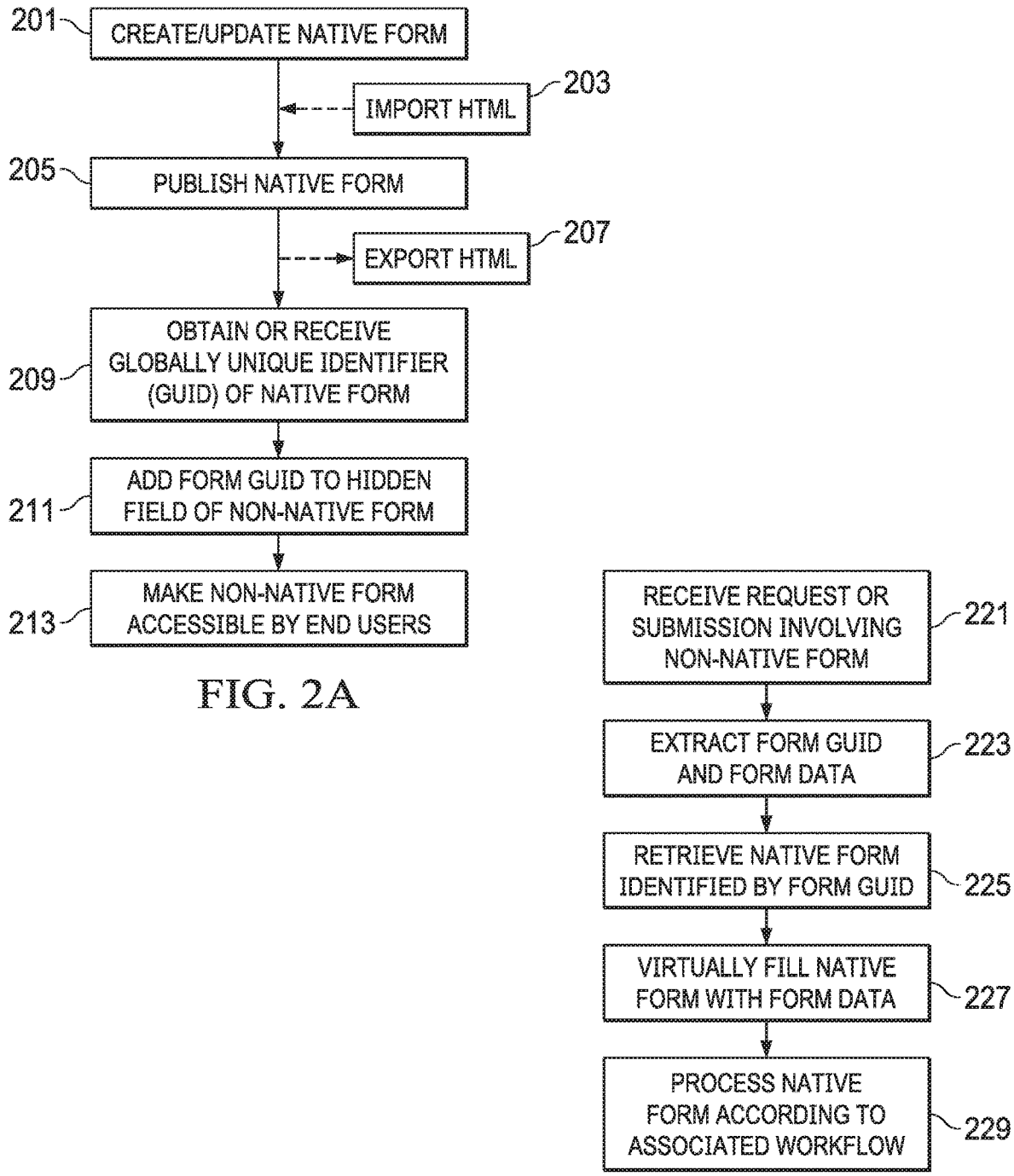

Contact Request Form

300

First Name *

Last Name *

Title

Company

Phone

Email Address *

Country *
-- Please Select --

State/Province
-- Please Select --

Reason for contact *

Submit   Cancel

FIG. 3A

```
<body style="font-family:arial,">
<table>
<tbody>
<tr>
<td rowspan="1" colspan="2"><img src="MyCompanyContactPageHeader.png"></td>
</tr>
<tr>
<td rowspan="2" colspan="1"><img src="MyCompanyContactPageLeftMenu.png"></td>
<td style="padding-top:2px; padding-left:5px"><img src="MyCompanyContactPageFormHeader.png"></td>
</tr>
<tr>
<td valign="top">

<!-- Form -->
322 → <form action="http://250.250.250.250/lvs" method="post" enctype="application/x-www-form-urlencoded">

<!-- Form Parameters -->
324 → <input type="hidden" name="VS__FormGUID" value="b9709c9z16a01450005zx7d7egsxgaxaaxgoa">
       <input type="hidden" name="VS__ResponseURL" value="http://www.mycompany.com/Contact_RespPage.html">
       <input type="hidden" name="VS__Note" value="Contact Request from External Web Form Submission">
```

Awesome Enterprise World Attendee Survey 430

First Name*  
[John]

Last Name*  
[Doe]

Email Address*  
[johndoe@abigcompany.com]

How may sessions did you attend?*  
[6-10 ▼]

Which tracks did you attend?*  
- ECM
- Business Network
- CEM
- Digital Process Automation
- Discovery
- Security How do you rate the event overall?*  
○ Poor  
○ Not bad  
○ Good  
⦿ Great Do you have any other comments about the event?  
[Fantastic event - more IFA next year please!]

SYSTEMS AND METHODS FOR INTELLIGENT FORMS AUTOMATION

CROSS-REFERENCE TO RELATED APPLICATION(S)

This application claims a benefit of priority under 35 U.S.C. § 119(e) from U.S. Provisional Application No. 62/839,306, filed Apr. 26, 2019, entitled "SYSTEMS AND METHODS FOR INTELLIGENT FORMS AUTOMATION," the entire disclosure of which is fully incorporated by reference herein for all purposes.

TECHNICAL FIELD

This disclosure relates generally to the field of data processing. More particularly, this disclosure relates to intelligent forms automation systems, methods, and computer program products, useful for efficient information collection and processing.

BACKGROUND OF THE RELATED ART

Forms are a useful tool for information collection. Governments and enterprises alike use a variety of forms to collect information for various purposes.

For example, an insurance organization ("insurer") may create an insurance claim form for use by its customers. The insurer can provide this form in multiple formats (e.g., PDF, Web, paper, etc.) to its customers in many ways (e.g., by mail, email, fax, or through its Website). A customer of the insurer can request and/or obtain a copy of the form from the insurer, fill out the form, and submit the form to the insurer (e.g., by mail, email, fax, or directly through the insurer's Website).

When the customer's filled out form is received by the insurer, depending on the format (e.g., printed on paper) and how the form is submitted, the intake process could be handled by a human (e.g., an employee or contractor of the insurer) who is tasked with reading the customer's filled out form and manually entering the data from the form into an enterprise system (e.g., a case management system). However, this manual data entry approach can be quite inefficient, error prone, and expensive.

The insurer could optionally provide a Web form for customers to fill and submit. This can provide a good experience for the customer, and ultimately provide more streamlined processing, but can require a very lengthy and expensive effort to implement by a developer, in particular, to handle processing of a submitted Web form using custom code built from scratch.

Today, enterprises most often rely on document capture technology to extract data from filled out forms, which are usually distributed in a portable document format (PDF), filled and printed (or printed and filled) prior to submission by hand/fax/post, or scanned as an image and submitted by email or through an organization's Website. Such document capture technology generally relies on creating form templates to be able to recognize the type of form being captured and the location of data, or rules that can be applied to automatically determine the location of data. Capture technology also uses recognition technology such as OCR (optical character recognition) and ICR (intelligent character recognition) to extract data. After validation, verification, and correction, the extracted data, which is now in an electronic form, can then be stored electronically for use with other applications and processes.

A significant effort is typically required by a user or customer to access a PDF form, fill it in, save it, print it, and submit it by mail or fax, or scan it and submit it electronically.

A significant effort is also typically required to configure a capture solution to extract information from forms. A significant effort is also typically required to create templates or define rules for each form type to be captured and determine which information is to be extracted, how it is validated, and how it is to be saved.

A significant effort is further typically required to handle submitted forms and route them, then scan and submit them to the capture software. A significant effort is also typically required to review, verify, and correct extracted information prior to saving it.

Most organizations have dozens or hundreds of forms for internal use and often handle forms submitted by customers and others externally as well. Therefore, an organization might, for example, handle automobile insurance claims forms from customers, human resources forms from employees, and invoices and purchase orders from partners and customers. Each one of these forms typically requires a significant effort as outlined to process.

SUMMARY OF THE DISCLOSURE

Having a more efficient way to process multiple types of forms and improve the customer experience when filling and submitting each form can be very beneficial to an organization. Accordingly, an objective of the invention is to significantly reduce the effort required to process forms by eliminating the need to use a capture solution and the steps required to process forms for data extraction. Another objective of the invention is to eliminate the need for capture and recognition technologies which are inherently error prone and require manual verification to ensure accuracy. Another objective of the invention is to improve customer experience so that forms can be created using preferred tools to meet customer expectations, forms can be hosted in a convenient location for customers, forms can be filled and submitted completely electronically without printing, mailing, scanning, or faxing, and customer forms can be automatically processed without delay. Yet another objective of the invention is to enable multiple types of forms (e.g., portable document format (PDF) forms, Web forms, native forms, etc.) created by multiple types of form design tools and hosted on multiple types of servers to be processed in a consistent way using the same form processing platform.

These and other objectives of the invention can be realized in intelligent forms automation systems, methods, and computer program products ("intelligent forms automation") disclosed herein.

In some embodiments, a method of intelligent forms automation can include receiving, by a form processing engine running on a server machine operating in an enterprise computing environment, a request or submission involving a non-native form; locating, by the form processing engine, a field in the non-native form; extracting, by the form processing engine, a globally unique identifier (GUID) from the field and form data from data fields of the non-native form; retrieving, by the form processing engine utilizing the GUID, a virtual copy of a native form identified by the GUID; virtually filling, by the form processing engine, the virtual copy of the native form with the form data; and processing, by the form processing engine, the virtual copy of the native form according to a workflow associated therewith. The form processing engine runs on and is part of an intelligent forms automation platform.

In some embodiments, the non-native form includes the same data fields required in the native form. In some embodiments, the non-native form can be a PDF form or a Web form.

How a non-native form is associated with a native form (which can have its own workflow process on the intelligent forms automation platform) can vary from implementation to implementation, depending upon the type of the non-native form. For instance, in some embodiments, a user who is permitted or otherwise authorized to access a native form can obtain or receive the GUID of the native form issued by a server on the intelligent forms automation platform. The non-native form originally does not have a field for the GUID of the native form. Thus, a field is created in the non-native form (e.g. by the user using a PDF editor) and the GUID is placed in the field in the non-native form. In this way, the non-native form is associated with the native form through the GUID in the field in the non-native form. As another example, in some embodiments, the GUID of the native form can be embedded in a form parameter in the source code of a non-native form (e.g., a Web form). In this way, the non-native form is associated with the native form through the GUID in the form parameter in the source code of the non-native form.

The native form is native to the intelligent forms automation platform. Each native form can be associated with a workflow process supported by the intelligent forms automation platform. The workflow processes are adapted for routing and/or exporting information to users and downstream computing facilities (e.g., enterprise content management systems, case management systems, human resources management systems, customer-relationship management systems, etc.). For instance, a workflow may direct a server to return a response containing a processing result to a requester, route a filled out native form to a downstream computing facility such as a repository, an enterprise system, an output channel, etc. and/or to a user device. Additionally or alternatively, the workflow can export the filled out native form data (e.g., into an eXtensible Markup Language (XML) file), etc.

In this way, the intelligent forms automation technology disclosed herein can eliminate the need to create complicated form processing code to handle submission of the non-native form and/or run any sort of capture process or recognition on the non-native form. Another benefit of the invention is that a non-native form can be generated from a native form. The non-native form thus generated automatically includes a GUID for the native form and, therefore, can be processed through a workflow associated with the native form. Accordingly, the intelligent forms automation platform disclosed here supports import and export of non-native forms in addition to native forms.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. The features illustrated in the drawings are not necessarily drawn to scale.

FIG. 2A is a flow chart illustrating an example of a method of intelligent forms automation according to some embodiments.

FIG. 2B is a flow chart illustrating an example of how a non-native form can be processed through a virtual submission method that utilizes a native form according to some embodiments.

FIG. 3A depicts a diagrammatic representation of a non-native form.

FIG. 3B depicts a portion of HTML source code for a non-native form.

FIG. 4D shows a non-limiting example of an existing Web form from which a native form can be created according to some embodiments.

FIG. 5A shows a non-limiting example of how an authorized user of an intelligent forms automation platform can navigate to a published native form according to some embodiments.

FIG. 6A shows a non-limiting example of a non-native form in which a field is added to store the value of a form GUID of a native form according to some embodiments.

DETAILED DESCRIPTION

The invention and the various features and advantageous details thereof are explained more fully with reference to the non-limiting embodiments that are illustrated in the accompanying drawings and detailed in the following description and Appendix A. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

An intelligent forms automation technology disclosed herein can make it easy to deliver comprehensive form solutions for information collection and processing. Benefits of this technology can include, but are not limited to, flexible form design, hosting, and portal features that ensure a great user experience (UX) and powerful form processing features that ensure efficient handling of information collected. These and other features disclosed herein can provide a comprehensive intelligent forms automation solution and platform for virtually any type of form processing applications.

Figure 1:
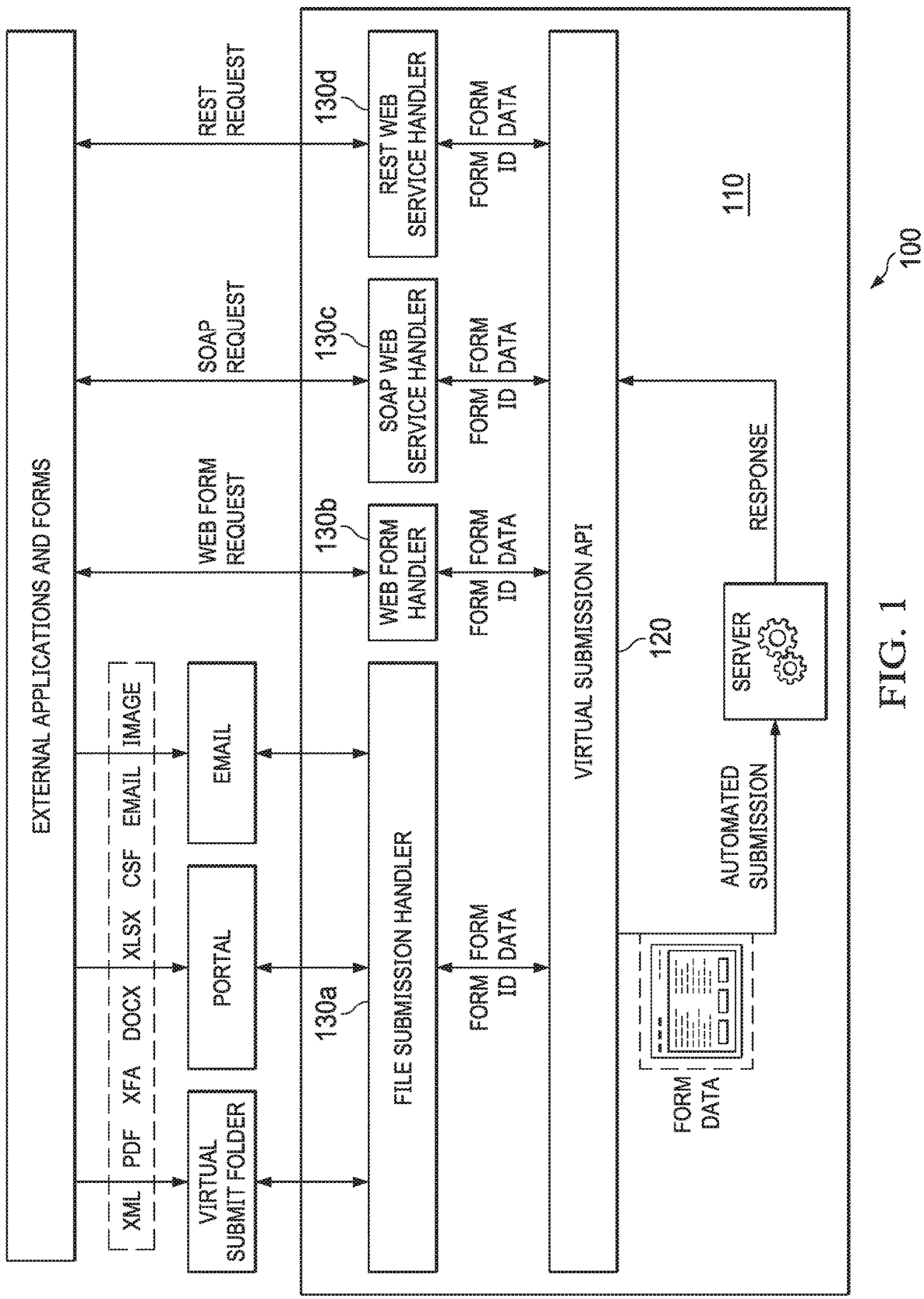
FIG. 1 depicts a diagrammatic representation of a functional architecture for implementing a comprehensive intelligent forms automation and virtual submission solution and platform according to some embodiments.

As a non-limiting example, this comprehensive intelligent forms automation solution and platform can include a virtual submission architecture illustrated in FIG. 1. In the example of FIG. 1, architecture 100 includes a server 110 having a virtual submission application programming interface (API) 120 and handlers 130a, . . . 130d. Server 110 can be configured to implement a powerful form processing engine at the backend. At the front end, the virtual submission layer (which can generally be referred to as an interface and which can include handlers 130a, . . . 130d and API 120) enables virtual submissions of various types. For instance, handlers 130a, . . . 130d can be configured for handling various types of requests (e.g., file submission requests, Web form requests, Simple Object Access Protocol or SOAP) Web service requests, Representational State Transfer (REST) Web service requests, etc.) from applications and/or forms. These applications and/or forms need not be hosted by server 110 or have a uniform representation. The only requirement is that each submission or request of data processing contains a globally unique form identifier (ID) and form data that server 110 is configured to recognize and process.

In embodiments disclosed herein, form IDs are usually not visible to any end user when displayed in a display mode. Instead, each form ID is contained in a field that can be hidden in a form. A form designer can view this field in the form in an editing mode. Any existing or newly created form or application can utilize the information processing power of server 110 by including a form ID that is known to or otherwise recognizable by server 110. That is, so long as a form or submission from an application has a form ID that can be obtained by a handler of server 110 and that can be recognized by server 110, data contained in the form can be automatically extracted and processed/routed by server 110.

In embodiments disclosed herein, each form ID identifies an electronic form that is known to server 110 and that can be associated with a workflow. Each form ID is globally unique (GU) across the platform on which server 110 operates and thus is also referred to herein as "form GUID." Such an electronic form can be created, published, and used to automatically capture and process information, for instance, in conjunction with a corresponding workflow. Because this entire process is native to the platform on which server 110 operates, such an electronic form is referred to herein as a native form.

A significant technical effect of the intelligent forms automation technology disclosed herein is that native forms are not required to be accessed or completed by end users. Further, non-native forms can be readily accepted into a virtual submission process that leverages all the benefits of native forms, including their associated automated workflows. Moreover, non-native forms can be generated from native forms, eliminating the need to manually create non-native forms used by disparate applications and/or systems external to the intelligent forms automation platform.

As an example, referring to FIG. 2A, a method of intelligent forms automation can include obtaining or receiving a form GUID of a native form (209), adding the form GUID to a field in a non-native form (211), and making the non-native form accessible by end users (213) according to some embodiments. In this scenario, both the native form and the non-native form may already exist (e.g., both have been published and in use). One or more of these steps can be performed by a form designer of the non-native form. The form designer could be the same person who created the native form, an authorized user who is permitted to access the native form as described below, or an authorized user who is permitted to receive the form GUID (e.g., via an email) from a user who is permitted to access the native form which can be stored on the platform on which server 110 operates.

In some embodiments, a method of intelligent forms automation can begin with creating or updating a native form (201) and including publishing the native form (205) (e.g., through a form design tool that is hosted on or otherwise communicatively connected to the intelligent forms automation platform). In this scenario, the native form has not been created or published (and thus does not have a form GUID). However, the non-native form may already exist. If so, the method may include importing a source file of the non-native form (203). For instance, the source code of a Web form can be found in a HyperText Markup Language (HTML) document on the Internet. The form designer can provide a network address (e.g., via a universal resource locator (URL)) of the HTML document to an import function of the form design tool which, in turn, can obtain the source code of the Web form from the HTML document, extract data fields from the source code of the Web form, and use the data fields thus extracted to create a native form that can be edited, saved, and published using the form design tool.

When the native form is published, it is issued a form GUID by a server on the intelligent forms automation platform. Once published (and thus has a form GUID), a non-native form can be generated from the native form through an export function of the form design tool (207).

The non-native form thus generated has the same data fields of the native form, including a field for the form GUID of the native form. Accordingly, in some embodiments, the export function can eliminate the need for a form designer to manually obtain a form GUID of a native form (209) and add the form GUID to a field in a non-native form (211). In that scenario, the form designer can use the HTML code (which includes an embedded form GUID for the native form in a form parameter) provided by the export function to create and publish a Web form (e.g., using an existing Web site editing tool) that is accessible by end users (213).

Referring to FIG. 2B, when a request or submission involving a non-native form is received (221), an appropriate form handler (e.g., 130a or 130b, depending upon the type of the request/submission) locates the form parameter or GUID field in the non-native form and extracts the form GUID and form data from the data fields of the non-native form (223). Utilizing the form GUID, server 110 is operable to retrieve a virtual copy of the native form (225), fill the virtual copy of the native form with the form data (227) (e.g., by mapping the data fields of the non-native form with the data fields of the native form), and process the virtual copy of the native form, for instance, through an associated workflow process (229).

Since the non-native form itself is not processed, but data contained therein is submitted for processing through the native form, this is referred to herein as "virtual submission." Outcome from this virtual submission processing can depend on the workflow, in an ad hoc manner. For instance, a workflow may direct the server to return a response containing a processing result to the requester, route the filled out native form to a downstream computing facility such as a repository, an enterprise system, an output channel, etc. and/or a user, export the filled out native form (e.g., into an XML file), etc.

In some embodiments, the non-native form could have the same or overlapping data fields as the native form having the unique form ID. In some embodiments, the non-native form could have more data fields than what is required by the native form. In some embodiments, such extra data fields can be ignored.

FIG. 3A depicts a diagrammatic representation of a non-native form 300. Non-native form 300 can be an example of a Web form. This Web form could be hosted by any appropriate Web server. The Web server may or may not be part of the platform on which server 110 operates. A user can navigate to the Web form on a Web site hosted by the Web server, fill out the Web form in a web browser, and submit the Web form. The Web form is submitted to the form processing server which is identified by a URL in the web form.

PDF forms can be another type of non-native forms. PDF forms can be processed by being dropped into a folder monitored by a file submission handler (e.g., handler 130a). For PDF forms, server 110 can use a form GUID embedded in a PDF form to identify a corresponding native form, map data from the PDF form into the native form, and process the native form accordingly.

In some cases, a user can submit a completed PDF form by sending it by email (e.g., as an attachment) to an entity. An administrator of the entity (e.g., a customer service representative, account manager, claims reviewer, etc.) can manually save the form into the folder monitored by the file submission handler. This process can be automated by, for instance, setting up a monitored email account for the entity so that when an email submission is received by an email server of the entity, it automatically drops a user-submitted form into the folder monitored by the file submission handler.

In some cases, a user can submit a completed PDF form by uploading it to a Web form operated by the entity. When the Web form is submitted, the PDF form can automatically be saved into the folder monitored by the file submission handler and processed.

FIG. 3B depicts a portion of HTML source code 320 which exemplifies the source code for a non-native form (e.g., Web form 300 shown in FIG. 3A). As shown in the example of FIG. 3B, source code 320 has a field 324 of a "hidden" type that contains a form GUID identifying a native form corresponding to the Web form. When the user submits the Web form, an action 322 in source code 320 calls for making a POST request with the form data and a form parameter containing the form GUID value in hidden field 324. As shown in FIG. 1, this Web form request can be handled by a Web form handler (e.g., handler 130b).

Figure 4A:
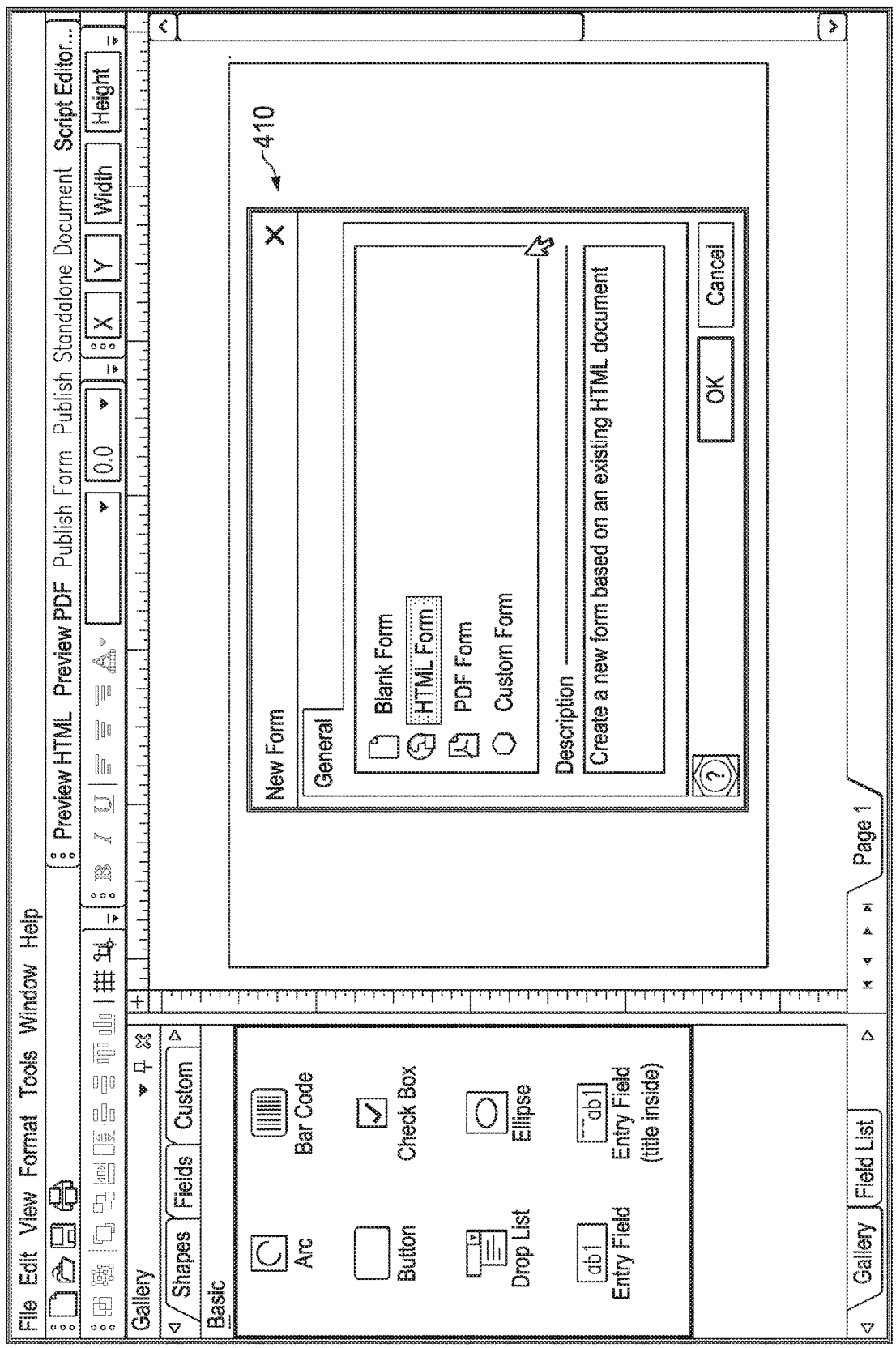
FIG. 4A shows a non-limiting example of a user interface of a form design tool that allows importation of an existing non-native form in creating a new native form according to some embodiments.

As discussed above, a native form can be created on the intelligent forms automation platform. A non-limiting example of a user interface 400 of a form design tool is shown in FIG. 4A. Form design tool 400 can be an example of an application that publishes native forms to server 110. Each native form can be associated with a workflow supported by the platform.

As illustrated in the non-limiting example of FIG. 4A, a new form can be created from a blank form, based on an existing HTML document, based on an existing PDF file, or based on a custom form. If an existing HTML document is selected, an import function is operable to import and parse the source code from the existing HTML document. This process is further described below.

Figure 4B:
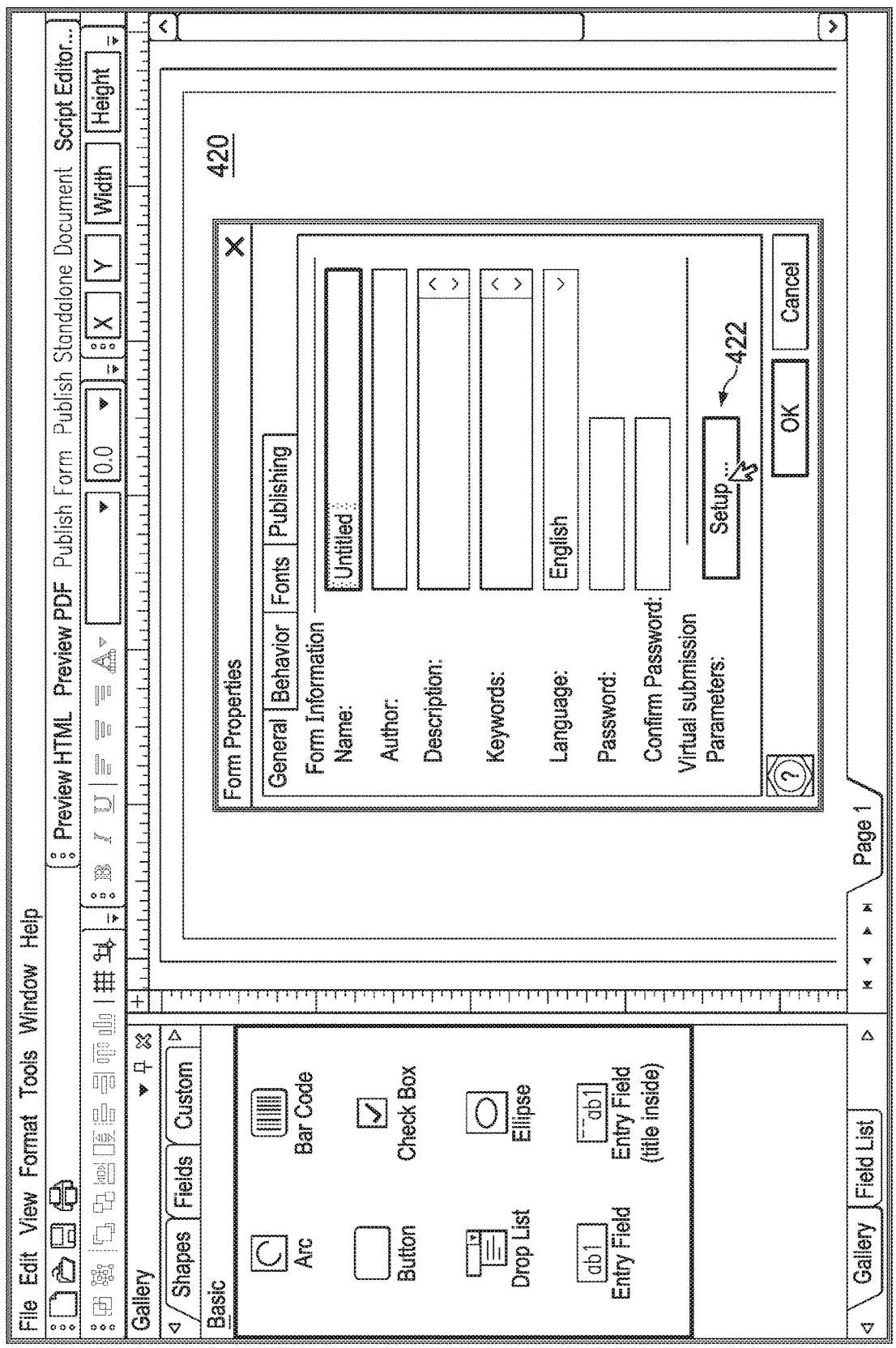
FIGS. 4B-4C together show a non-limiting example of how virtual submission parameters can be configured according to some embodiments.
Figure 4C:
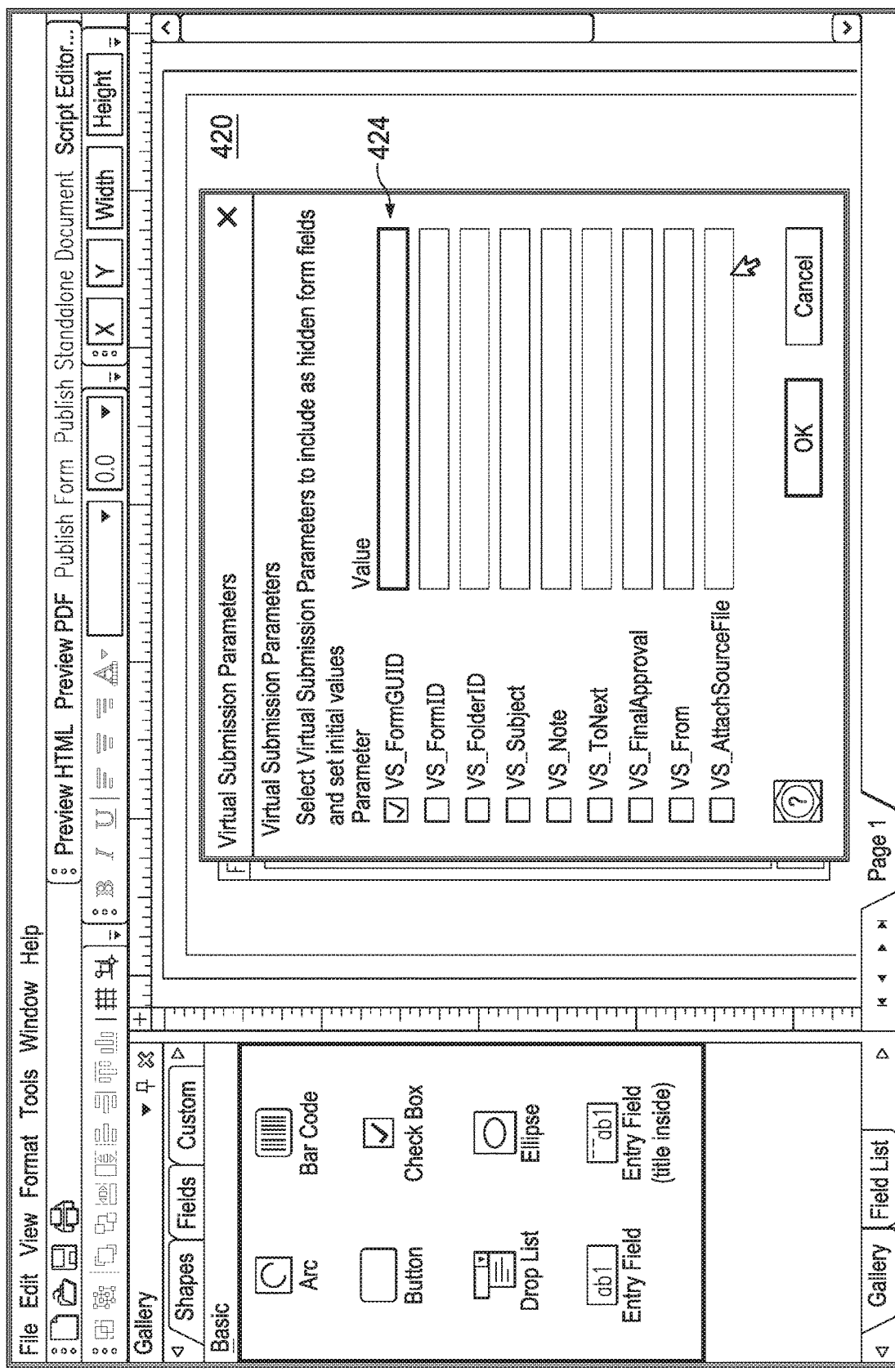

A form designer who is permitted to create, edit, and/or publish a native form (e.g., created from a blank form 420 shown in FIG. 4B) can set up virtual submission parameters 422 by, for instance, accessing a "form properties" configuration function, as shown in FIG. 4B. As illustrated in the example of FIG. 4C, the virtual submission parameters can include a form GUID field or parameter 424 (e.g., "VS_formGUID"). Prior to publication, form GUID field or parameter 424 does not have an associated value. When the native form is published (e.g., by an authorized form designer), a form GUID is automatically assigned (e.g., by server 110) to the native form as part of the publishing process. The form designer can view the assigned value by navigating to form GUID field or parameter 424, as shown in FIGS. 4B-4C.

FIG. 4D shows a non-limiting example of an existing Web form 430 from which a native form can be created. Referring to FIG. 4A, responsive to an instruction from a form designer to create a new native form from an existing HTML form, an import function of form design tool 400 is operable to prompt the form designer to provide an URL where Web form 430 resides, obtain the source code (e.g., in HTML) of Web form 430 from the URL provided by the form designer, parse the source code to identify data fields contained therein, use the data fields thus identified to populate a blank native form, and present the native form with the data fields imported from Web form 430 through form design tool 400.

Figure 4E:
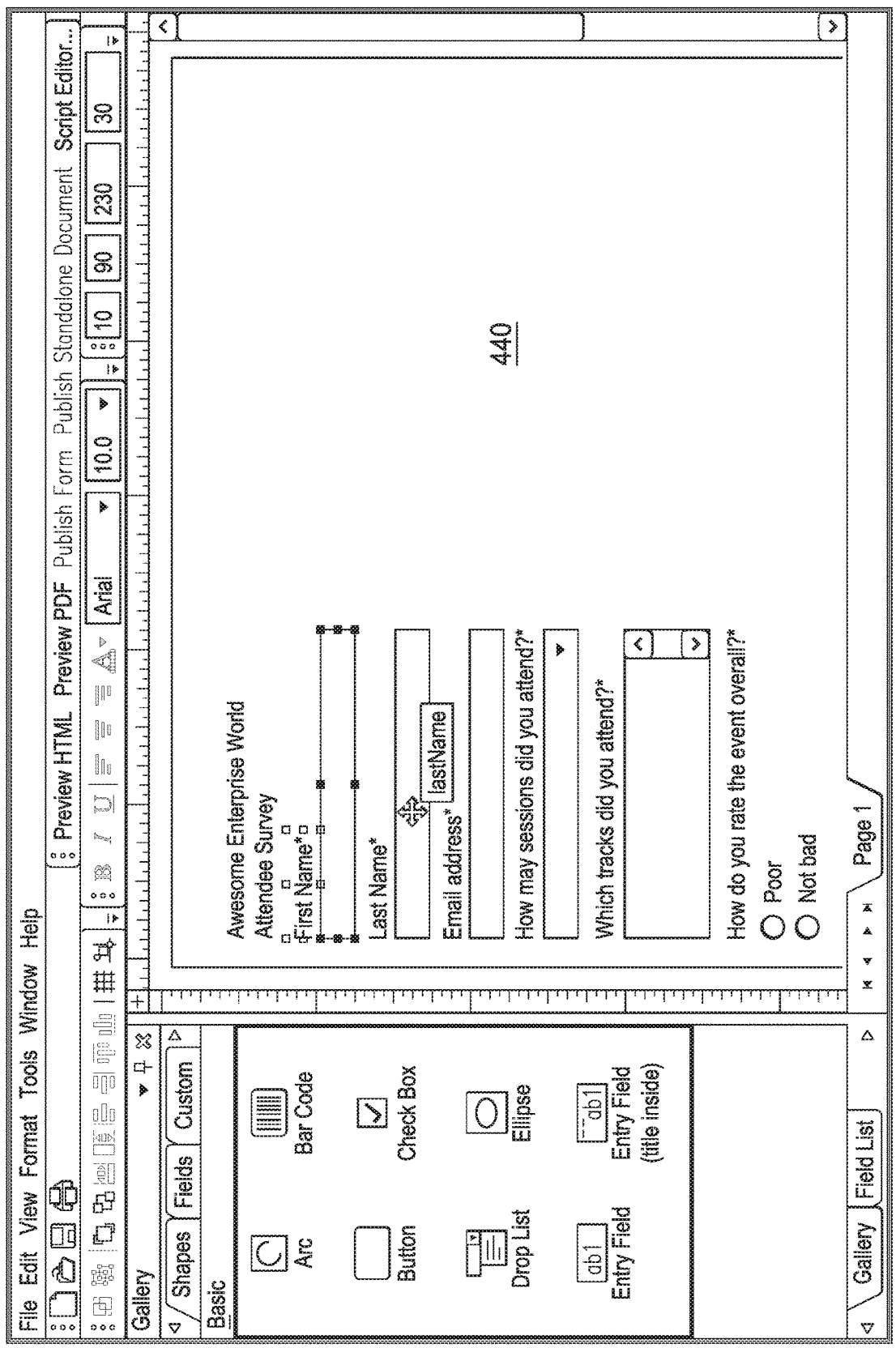
FIG. 4E shows a non-limiting example of a native form created from an existing Web form according to some embodiments.

As exemplified in FIG. 4E, a native form 440 created from an existing non-native form can be edited using form design tool 400 (e.g., by selecting and positioning an input field imported from the non-native form). The importation together with editability means that a native form (e.g., native form 440) and a non-native form (e.g., Web form 430)

can have the same or overlapping data fields, even if they may have different layouts and/or different styles and formats.

Figure 4F:
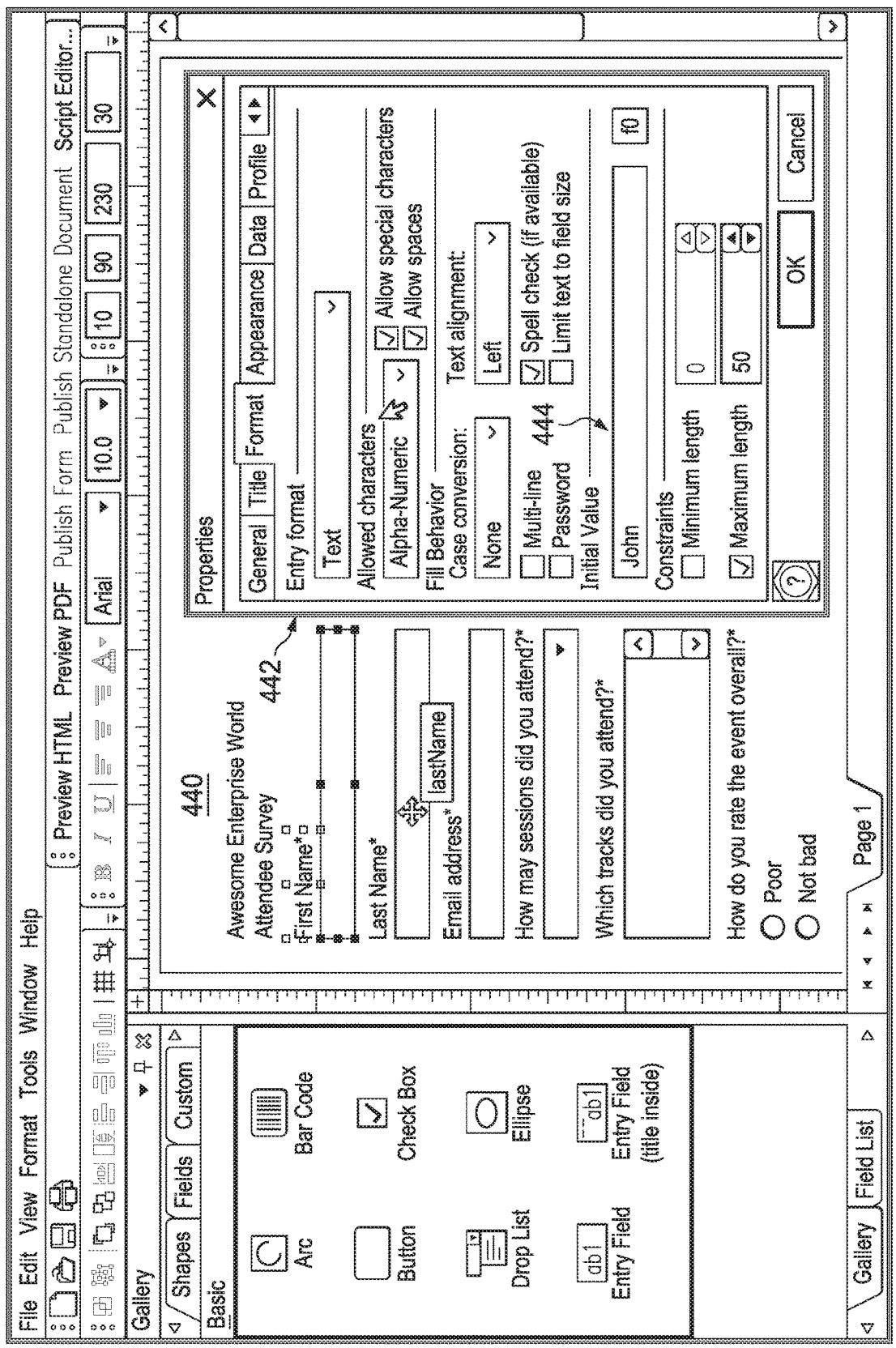
FIG. 4F shows a non-limiting example of field properties imported from an existing Web form according to some embodiments.

In addition to the data fields, the import function of form design tool 400 can also import properties of the data fields, e.g., character types, fill behaviors, initial values, constraints, etc. For instance, in the example of FIG. 4D, Web form 430 has a data field "First name" that has a value of "John." Native form 440 shown in FIG. 4F has a data field "First name" imported from Web form 430. The form designer can access (e.g., by right-clicking the "First name" field) and view properties 442, including initial value 444 (e.g., "John") associated with the selected data field imported from Web form 430.

Figure 4G:
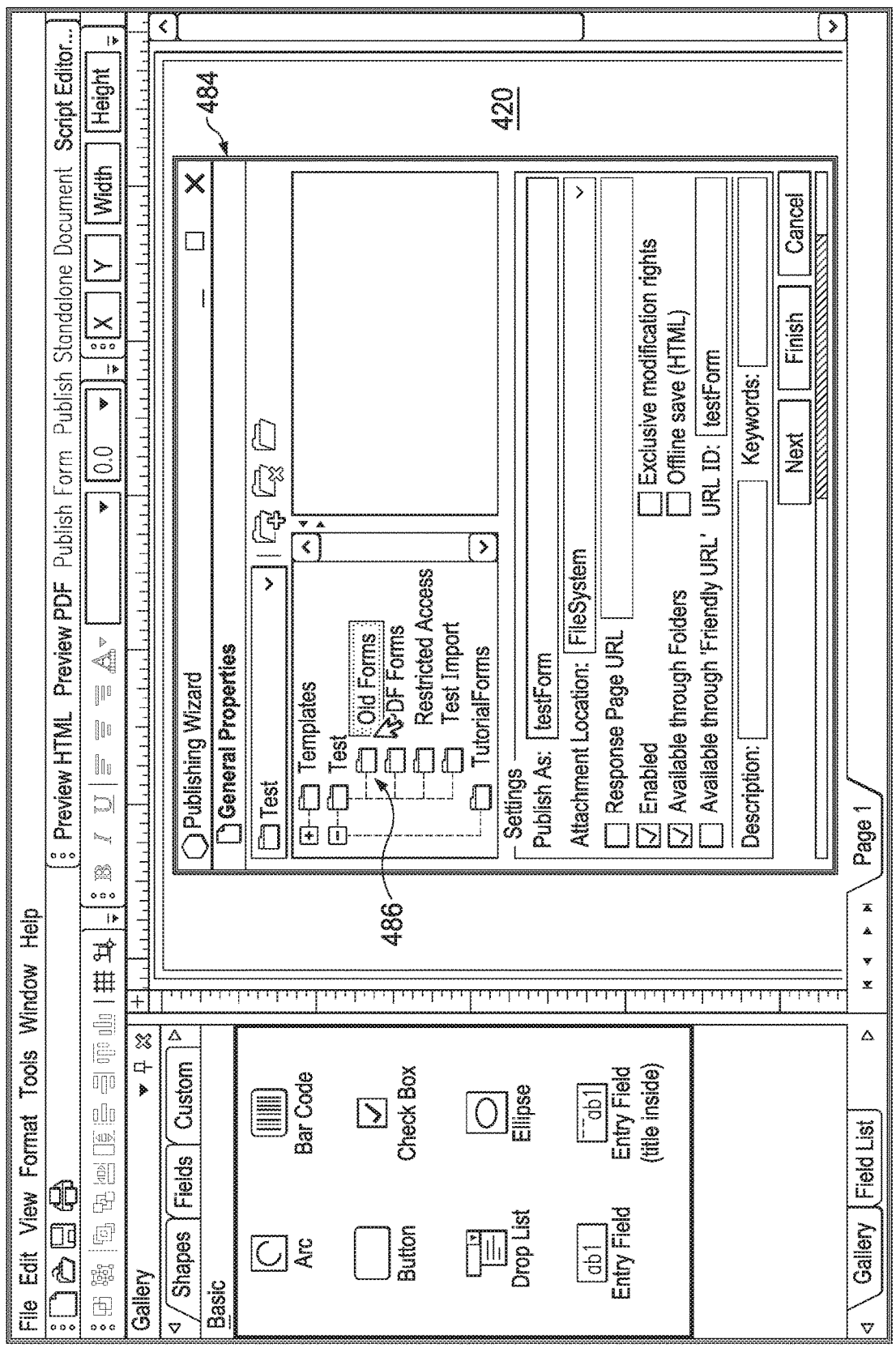
FIG. 4G shows a non-limiting example of a publishing wizard that can be used to publish a native form according to some embodiments.
Figure 4H:
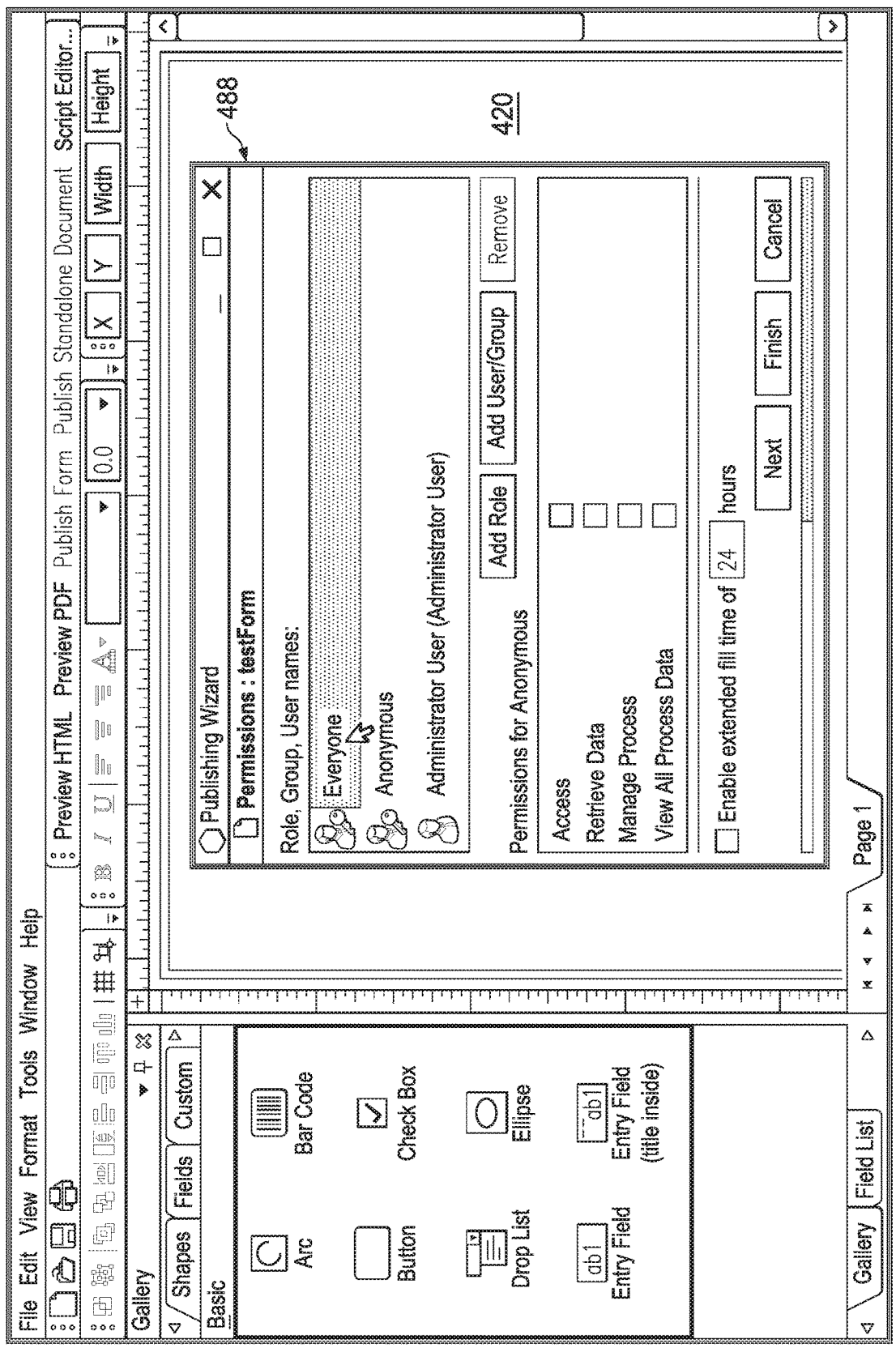
FIG. 4H shows a non-limiting example of how to set permissions for accessing a native form according to some embodiments.
Figure 4I:
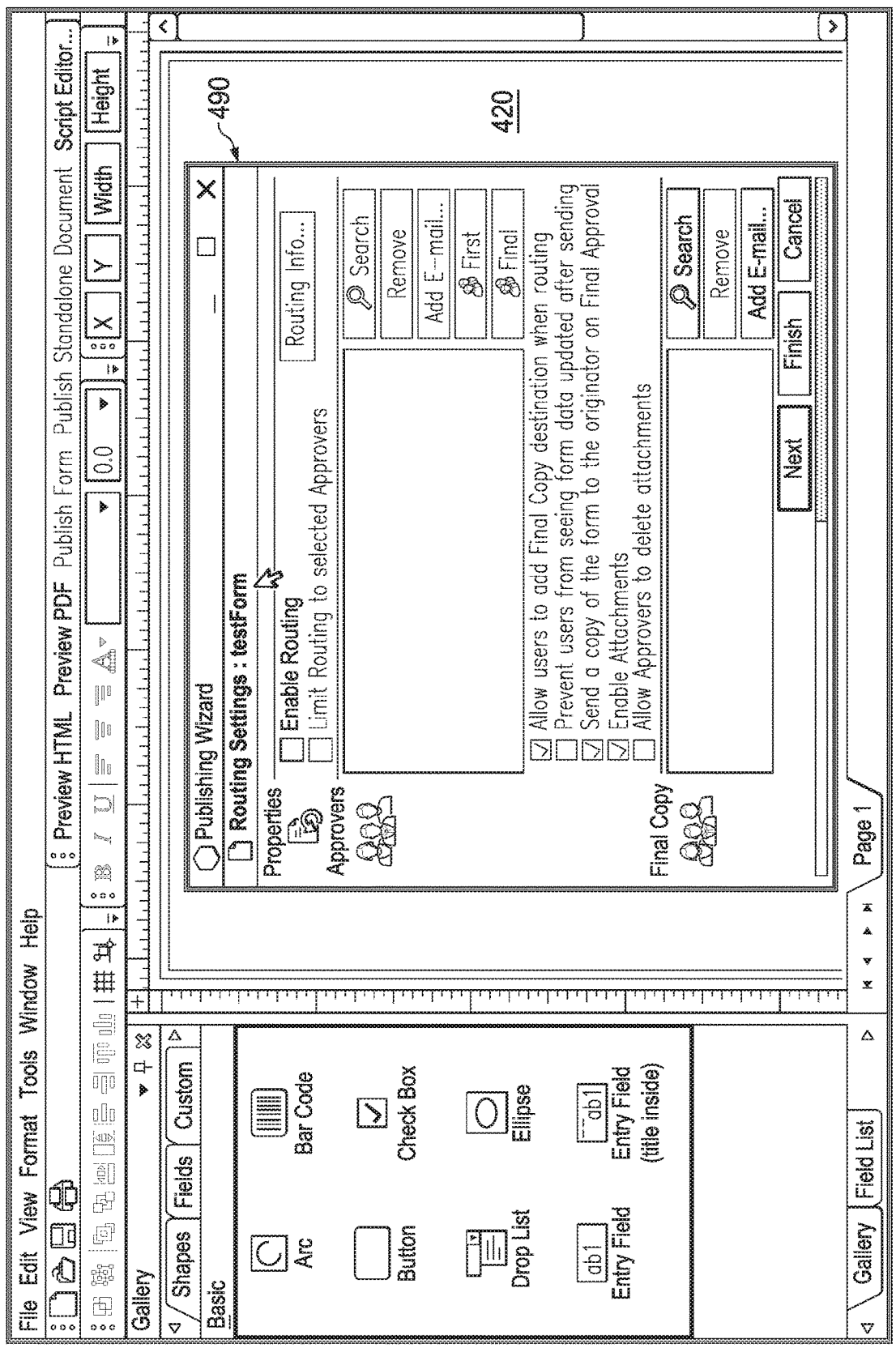
FIG. 4I shows a non-limiting example of how to configure routing settings for a native form according to some embodiments.

As illustrated in FIG. 4G, a user of form design tool 400 (e.g., a form designer) can publish a native form (e.g., native form 420), for instance, using a publishing wizard 484, into a folder 486 (e.g., a designated location in a file system maintained by the intelligent forms automation platform disclosed herein). As illustrated in FIG. 4H, using publishing wizard 484, the user can set up permissions 488 (e.g., by role, per user group, or per user names, etc.) and specify how a permitted user may access the published native form. At this time, the user can also indicate, through a routing settings configuration option 490, whether the native form should be routed, as illustrated in FIG. 4I.

Figure 5A:
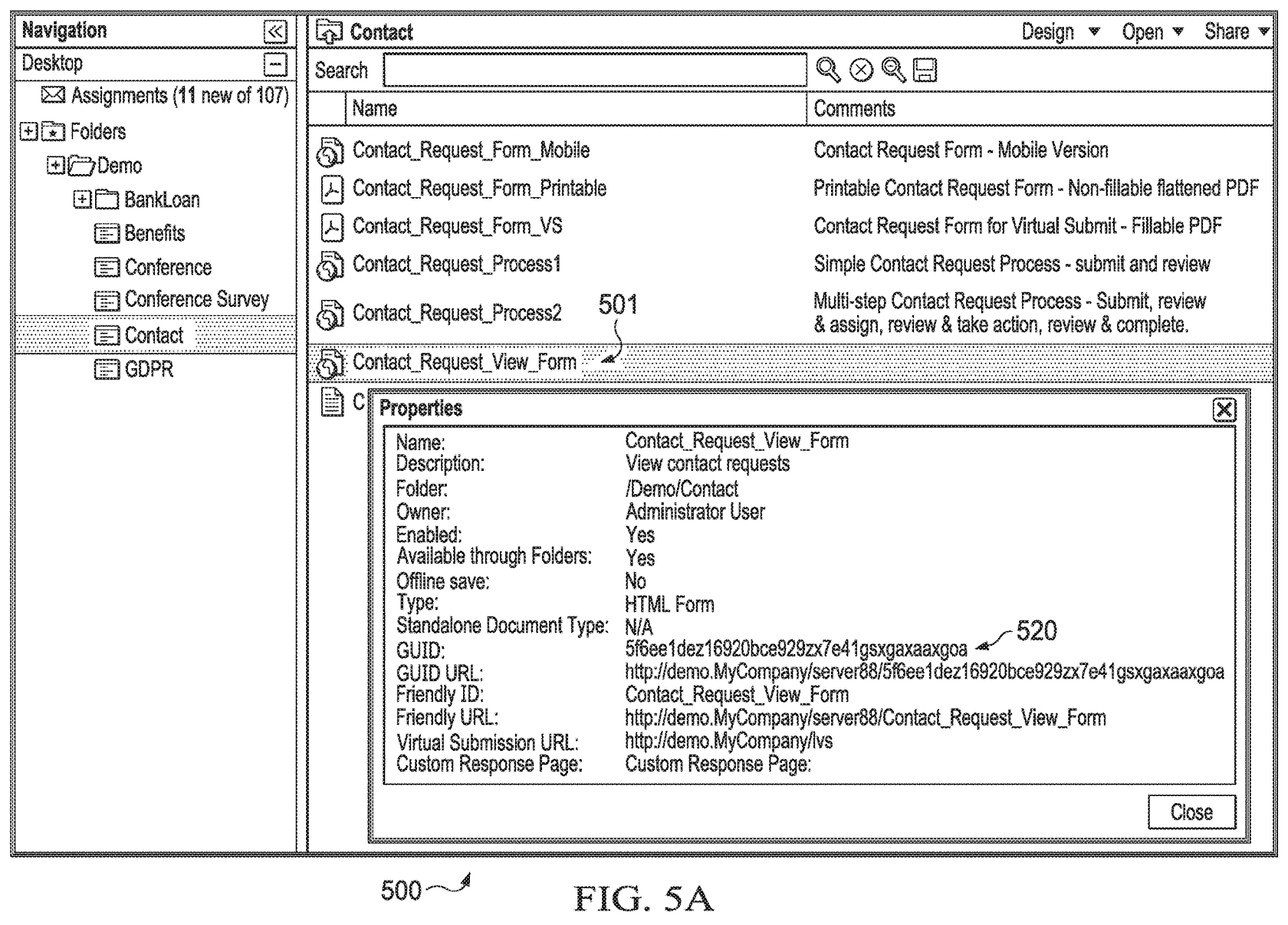
Figure 5B:
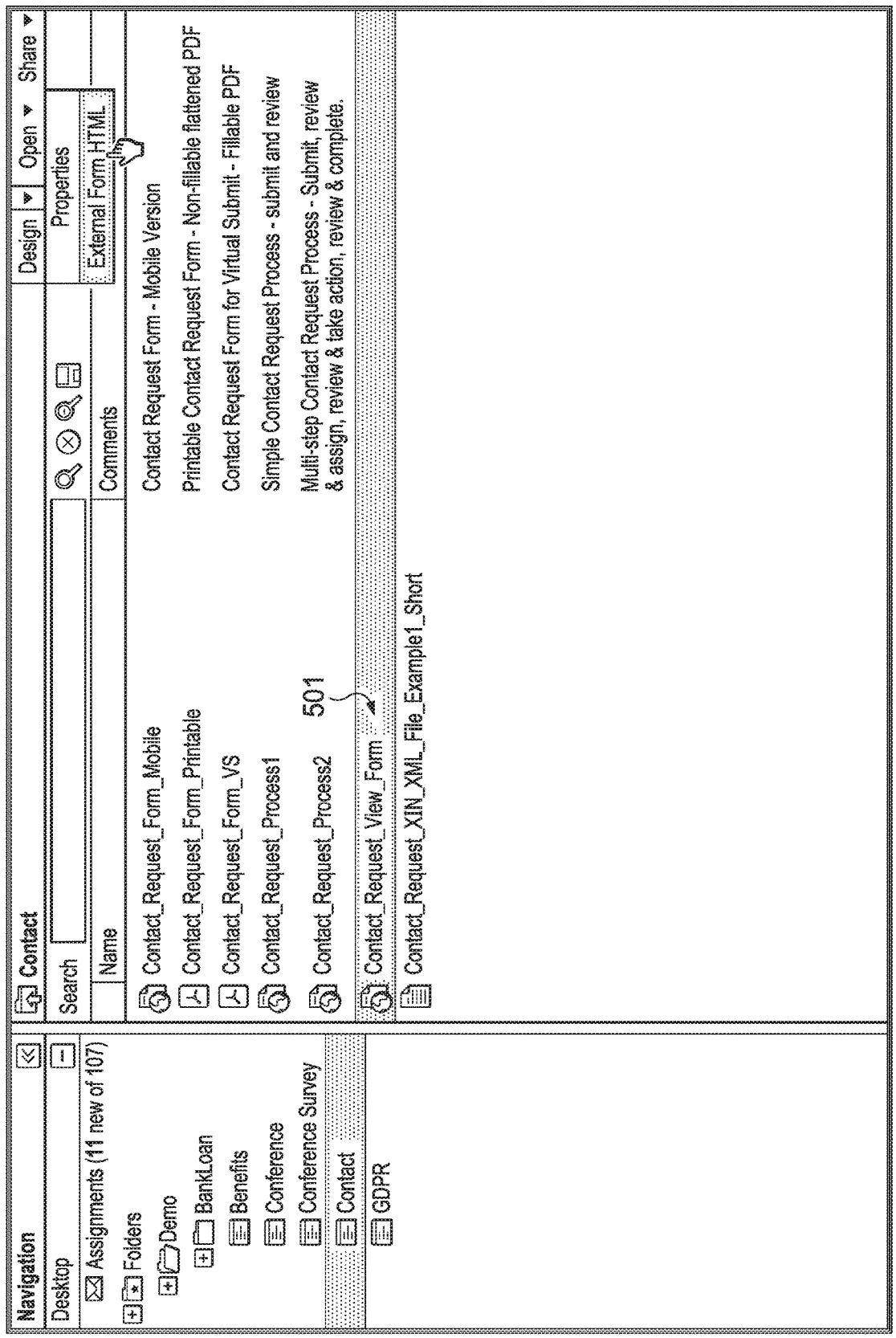
FIGS. 5B-5C together show a non-limiting example of how to create a non-native form from a published native form according to some embodiments.

The native form thus created and published can be accessed in many ways. FIG. 5A shows how an authorized user of server 110 running on the intelligent forms automation platform disclosed herein can navigate, via a user interface or portal 500 thereof, to a published native form 501 (e.g., to a folder where it resides) and view its properties, including a form GUID 520 that uniquely identifies published native form 501. In the example of FIG. 5A, the value for form GUID 520 is issued by a publication server and can be copied and pasted into a non-native form (e.g., a Web form or a PDF form). In doing so, the non-native form is linked to or otherwise associated with published native form 501. For instance, the user can highlight and copy this server-assigned value and use it to associate an existing non-native form with published native form 501. If a non-native form does not yet exist, the association with published native form 501 can be automated and streamlined. This is explained below with reference to FIGS. 5B-5C.

More specifically, if desired, the user can create an HTML document from published native form 501. As exemplified in FIG. 5B, this can be done by accessing an export function of user interface 500 (e.g., via a submenu "Form HTML," "External Form HTML," etc.). Responsive to a user instruction to create a non-native form (e.g., an HTML form) from a selected native form (e.g., published native form 501), this export function is operable to access the selected published native form, obtain the data fields (without formatting information) from the selected published native form, and format the data fields in a non-native format (e.g., in HTML source code).

Figure 5C:
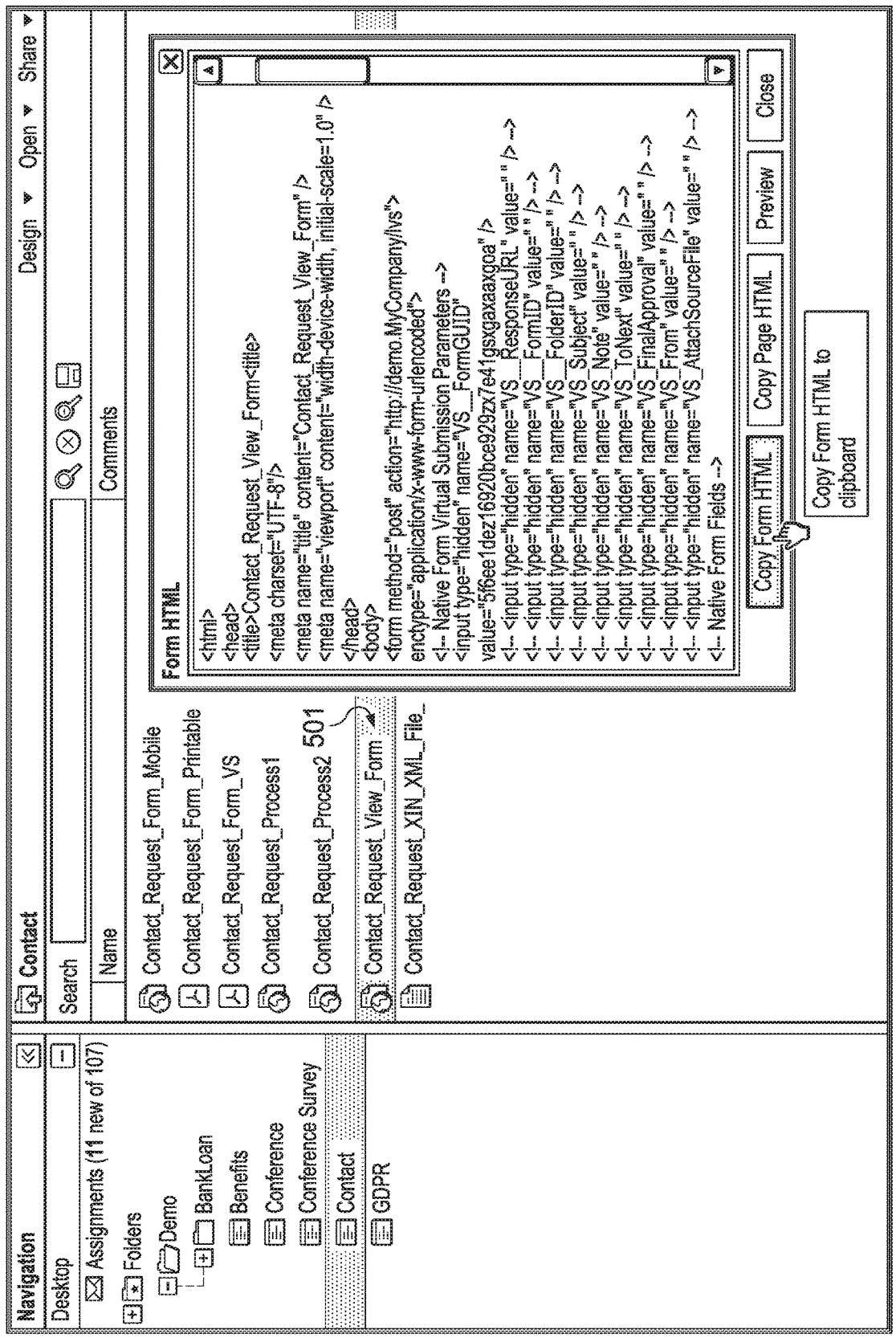

As shown in FIG. 5C, the source code for the non-native form thus generated by the export function of user interface 500 can be presented (e.g., in a popup window) to the user with several options. At this time, the user is free to use the source code for the non-native form independently of published native form 501. For instance, the source code for the non-native form can be provided to a web server external to the intelligent forms automation platform disclosed herein. Because the source code for the non-native form thus generated by the export function of user interface 500 automatically includes the form GUID and data fields of published native form 501, when the non-native form is submitted to the intelligent forms automation platform for processing, it is processed through a workflow associated with published native form 501.

In cases where a non-native form already exists, it can still be associated with a native form having a corresponding workflow on the intelligent forms automation platform. For example, a user can highlight and copy a server-assigned value for a form GUID shown in FIG. 5A and use it to associate an existing non-native form with a published native form. The form GUID value can be provided to an entity that owns or hosts a Web form. The Web form may be created independently of the native form, and vice versa. In this way, when it is desired to use a new or existing Web form with the intelligent forms automation platform, even a non-programmer could add a hidden field with a native form's GUID to the Web form at any given time.

Figure 6A:
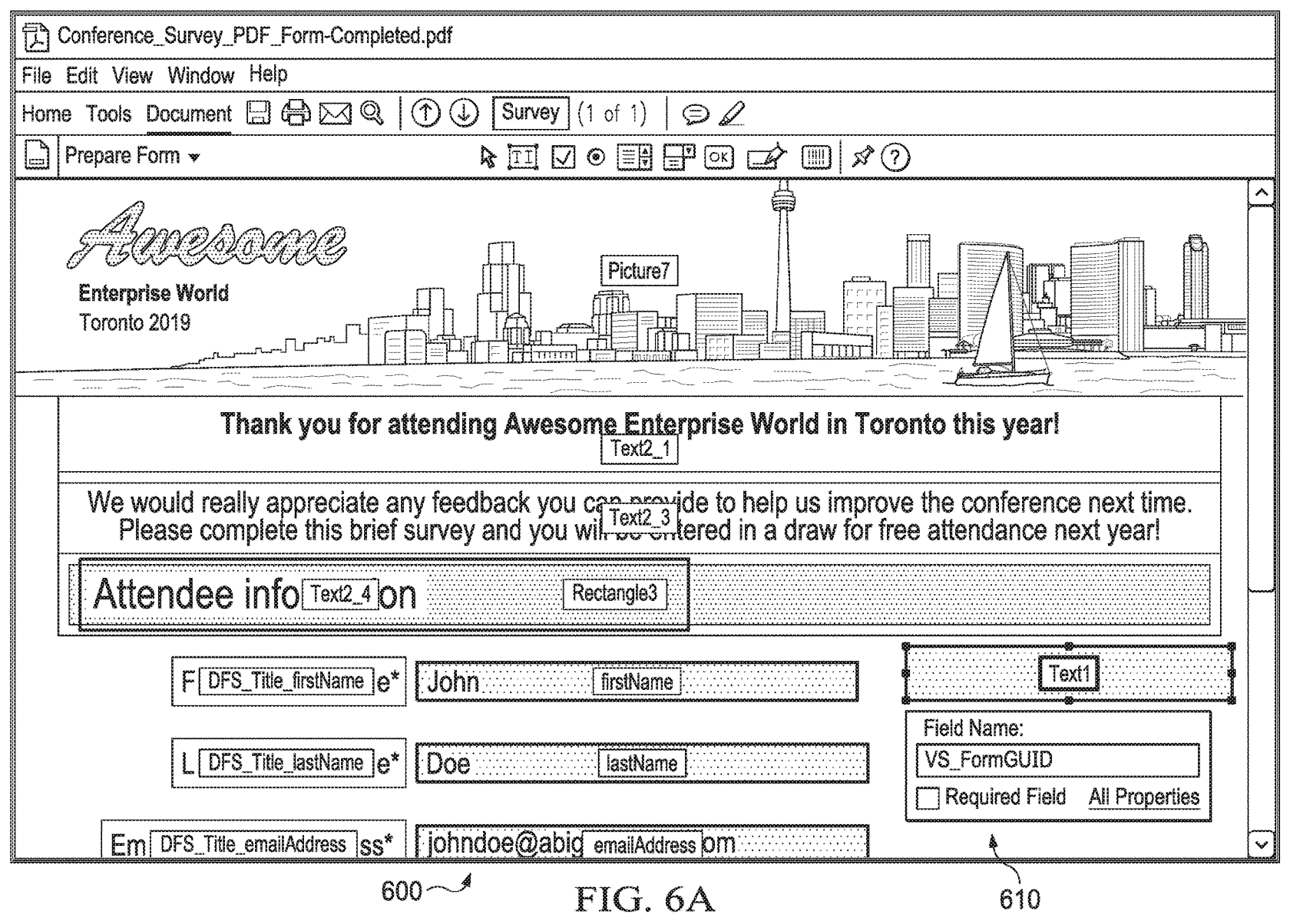
Figure 6B:
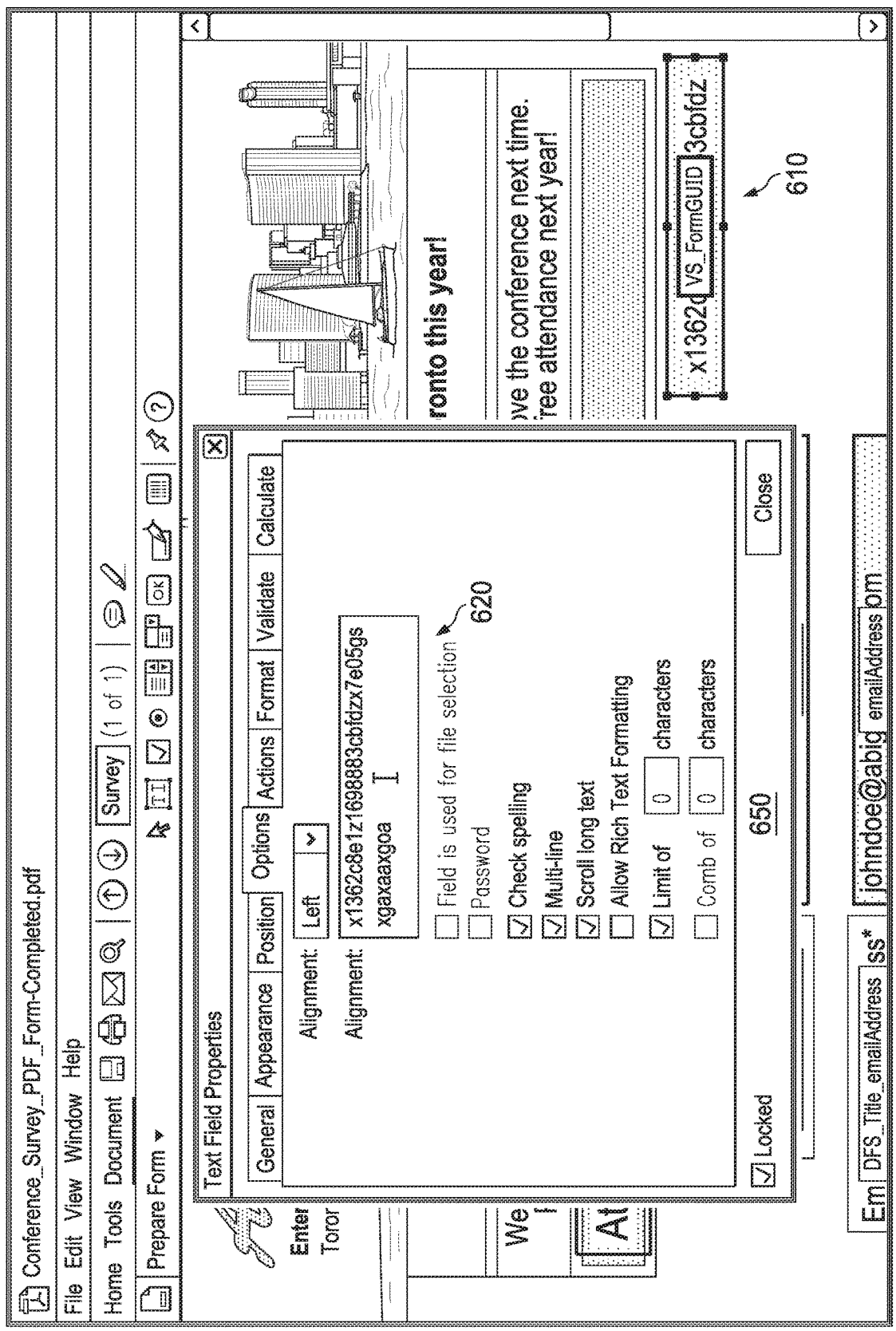
FIG. 6B shows a non-limiting example of how a hidden form GUID value can be viewed/verified by accessing a field properties window within a non-native form according to some embodiments.

As a non-limiting example, FIG. 6A shows a non-native PDF form 600 in which a field 610 (e.g., with a field name "VS_FormGUID") is added to store the value of a form GUID of a native form. The value of the form GUID can be hidden from view when non-native form 600 is rendered and displayed to an end user. For instance, as illustrated in FIG. 6B, a hidden form GUID value 620 can be viewed/verified by accessing a field properties window 650.

Because server 110 already has all the configuration information of the native form, including the routing information, server 110 understands how to process the native form. To leverage this knowledge, server 110 is operable to use hidden form GUID value 620 in non-native form 600 to locate an appropriate native form having the form GUID, fill the native form with data from non-native form 600, field by field, and automatically process the native form according to its configured workflow to route and export information to users and downstream computing facilities (e.g., enterprise content management systems, case management systems, human resources management systems, customer-relationship management systems, etc.) without needing to process non-native form 600, or run any sort of capture process or recognition on non-native form 600.

In this way, anyone who has permission to access a native form can use its form GUID to associate a non-native form with the native form. This association process can be as straightforward as adding a field to a new or existing PDF or Web form.

The intelligent forms automation solution disclosed herein can provide hundreds of different uses for intelligent forms automation, ranging from internal employee forms, to customer service request forms, to account onboarding, and more, and can accelerate digital transformation, help organizations migrate from manual and often paper-based processes to online automated processes, enhance user experience, improve interaction with users, and process user requests more efficiently. While the intelligent forms automation solution disclosed herein can be deployed across just about every industry and organization type, it can be particularly useful to entities in highly regulated industries where it is important to collect a lot of information securely and process it efficiently. No matter how the data is collected and through what form, it can be processed using a single and efficient automated process.

The intelligent forms automation platform disclosed herein enables a different and more efficient approach to processing PDF forms with traditional methods that use a manual data entry process or capture solution and require a much more significant effort. The approach also enables a more efficient method for a user to fill and submit PDF forms since printing, filling by hand, scanning, and mailing etc. are not required. The approach also enables processing of external Web forms with a unique interface that makes it easy for external Web forms to be created and used with the platform. Together with other interfaces that enable submission and processing of native forms, and APIs that enable submission and processing of data from other applications, the platform offers a unique approach to intelligent forms automation.

Figure 7:
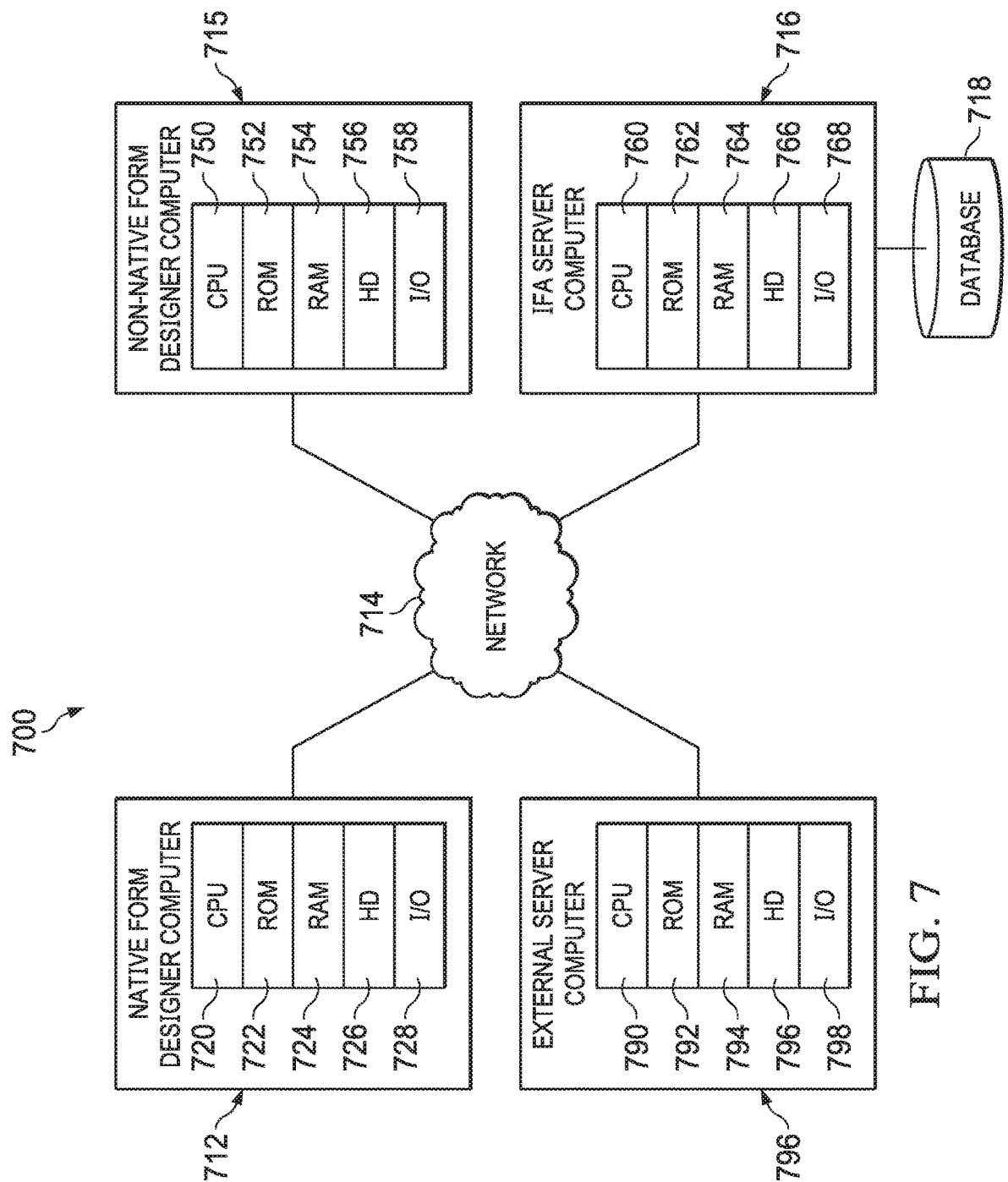
FIG. 7 depicts a diagrammatic representation of a distributed network computing environment where embodiments disclosed can be implemented.

FIG. 7 depicts a diagrammatic representation of a distributed network computing environment where embodiments disclosed can be implemented. In the example illustrated, network computing environment 700 includes network 714 that can be bi-directionally coupled to computer 712, computer 715, computer 716, and computer 796. Computer 716 can be bi-directionally coupled to data store 718. Network 714 may represent a combination of wired and wireless networks that network computing environment 700 may utilize for various types of network communications known to those skilled in the art. Native forms can be designed on computer 712 and published to an intelligent forms automation (IFA) server computer 716. Non-native forms can be designed on computer 715 and published to server computer 796. Non-native forms (e.g., Web forms, PDF forms, etc.) can be hosted on external server computer 796 (e.g., a Web server or portal) and submitted to IFA server 716.

For the purpose of illustration, a single system is shown for each of computer 712, computer 715, and computer 796. However, with each of computer 712, computer 715, and computer 796, a plurality of computers (not shown) may be interconnected to each other over network 714. For example, a plurality of computers 712 and a plurality of computers 715 may be coupled to network 714. Computers 712 may include data processing systems for communicating with computer 716. Computers 712 may include data processing systems (e.g., workstations running form design software) for form designers whose jobs may require them to design, build, and/or customize forms used in network computing environment 700.

Computer 712 can include central processing unit ("CPU") 720, read-only memory ("ROM") 722, random access memory ("RAM") 724, hard drive ("HD") or storage memory 726, and input/output device(s) ("I/O") 728. I/O 729 can include a keyboard, monitor, printer, electronic pointing device (e.g., mouse, trackball, stylus, etc.), or the like. Computer 712 can include a desktop computer, a laptop computer, a personal digital assistant, a cellular phone, or nearly any device capable of communicating over a network. Computer 715 may be similar to computer 712 and can comprise CPU 750, ROM 752, RAM 754, HD 756, and I/O 758.

Likewise, computer 716 may include CPU 760, ROM 762, RAM 764, HD 766, and I/O 768. Computer 716 may include one or more backend systems configured for providing content Web services (CWS) over network 714. In some embodiments, activity flow information may be stored in data store or database 718. Many other alternative configurations are possible and known to skilled artisans.

Each of the computers in FIG. 7 may have more than one CPU, ROM, RAM, HD, I/O, or other hardware components. For the sake of brevity, each computer is illustrated as having one of each of the hardware components, even if more than one is used. Each of computers 712, 715, and 716 is an example of a data processing system. ROM 722, 752, and 762; RAM 724, 754, and 764; HD 726, 756, and 766; and data store 718 can include media that can be read by CPU 720, 750, or 760. Therefore, these types of memories include non-transitory computer-readable storage media. These memories may be internal or external to computers 712, 715, or 716.

Portions of the methods described herein may be implemented in suitable software code that may reside within ROM 722, 752, or 762; RAM 724, 754, or 764; or HD 726, 756, or 766. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A method for intelligent forms automation, the method comprising:
   receiving, by a form processing engine running on a server machine operating in an enterprise computing environment, a request or submission involving a non-native form, wherein the non-native form has a previously added non-visible hidden field comprising a globally unique identifier (GUID) shared by a plurality of other non-native forms, wherein the GUID identifies a first native form of a plurality of different native forms stored on a server, the first native form processable by the form processing engine prior to the non-native form being made accessible by end users, wherein each non-native form is associated with a respective workflow;
   locating, by the form processing engine, the previously added field in the non-native form;
   extracting, by the form processing engine, the GUID that identifies the first native form of the plurality of native forms from the previously added field and form data from data fields of the non-native form;
   retrieving, by the form processing engine utilizing the GUID, a virtual copy of the first native form identified by the GUID;
   populating, by the form processing engine, the virtual copy of the first native form with the form data from the data fields of the non-native form by mapping the data fields of the non-native form with data fields from the native form; and
   processing, by the form processing engine, the virtual copy of the first native form according to the respective workflow associated with the first non-native form.

2. The method according to claim 1, wherein the non-native form includes same or overlapping data fields required in the first native form.

3. The method according to claim 1, wherein the non-native form comprises a portable document format (PDF) form or a Web form.

4. The method according to claim 3, further comprising:
   obtaining or receiving the GUID from a user permitted to access the first native form;
   creating the non-visible hidden field in the PDF form; and
   placing the GUID in the hidden field in the PDF form to thereby associate the PDF form with the first native form through the GUID in the hidden field in the PDF form.

5. The method according to claim 3, further comprising:
   obtaining or receiving the GUID from a user permitted to access the first native form; and
   embedding the GUID in a form parameter in source code of the Web form to thereby associate the Web form with the first native form through the GUID in the form parameter in the source code of the Web form.

6. The method according to claim 1, further comprising:
   responsive to a user instruction to create an editable native form from a non-native form, obtaining source code of the non-native form, parsing the source code to identify fields, extracting the fields and values associated therewith, and creating the editable native form using the fields and values associated therewith thus extracted from the non-native form, the editable native form editable through a form design tool.

7. The method according to claim 1, further comprising:
   responsive to a user instruction to create a Web form from a published native form, obtaining fields in the published native form without formatting information, generating source code of the Web form using the fields obtained from the published native form, and presenting the source code of the Web form through a user interface on a user device.

8. A system for intelligent forms automation, the system comprising:
   a processor;
   a non-transitory computer-readable medium; and
   stored instructions translatable by the processor for:
      receiving a request or submission involving a non-native form, wherein the non-native form has a previously added non-visible hidden field comprising a globally unique identifier (GUID) shared by a plurality of other non-native forms, wherein the GUID identifies a first native form of a plurality of different native forms stored on a server, the first native form processable by the form processing engine prior to the non-native form being made accessible by end users, wherein each non-native form is associated with a respective workflow;
      locating the previously added field in the non-native form;
      extracting the GUID that identifies the first native form of the plurality of native forms from the previously added field and form data from data fields of the non-native form;
      retrieving, utilizing the GUID, a virtual copy of the first native form identified by the GUID;
      populating the virtual copy of the first native form with the form data from the data fields of the non-native form by mapping the data fields of the non-native form with data fields from the native form; and
      processing the virtual copy of the first native form according to the respective workflow associated with the first non-native form.

9. The system of claim 8, wherein the non-native form includes same or overlapping data fields required in the first native form.

10. The system of claim 8, wherein the non-native form comprises a portable document format (PDF) form or a Web form.

11. The system of claim 10, wherein the stored instructions are further translatable by the processor for:
    obtaining or receiving the GUID from a user permitted to access the first native form;
    creating the non-visible hidden field in the PDF form; and
    placing the GUID in the hidden field in the PDF form to thereby associate the PDF form with the first native form through the GUID in the hidden field in the PDF form.

12. The system of claim 10, wherein the stored instructions are further translatable by the processor for:
    obtaining or receiving the GUID from a user permitted to access the first native form; and
    embedding the GUID in a form parameter in source code of the Web form to thereby associate the Web form with the first native form through the GUID in the form parameter in the source code of the Web form.

13. The system of claim 8, wherein the stored instructions are further translatable by the processor for:

responsive to a user instruction to create an editable native form from a non-native form, obtaining source code of the non-native form, parsing the source code to identify fields, extracting the fields and values associated therewith, and creating the editable native form using the fields and values associated therewith thus extracted from the non-native form, the editable native form editable through a form design tool.

14. The system of claim 8, wherein the stored instructions are further translatable by the processor for:

responsive to a user instruction to create a Web form from a published native form, obtaining fields in the published native form without formatting information, generating source code of the Web form using the fields obtained from the published native form, and presenting the source code of the Web form through a user interface on a user device.

15. A computer program product for intelligent forms automation, the computer program product comprising a non-transitory computer-readable medium storing instructions translatable by a processor of an intelligent forms automation platform for:

receiving a request or submission involving a non-native form, wherein the non-native form has a previously added non-visible hidden field comprising a globally unique identifier (GUID) shared by a plurality of other non-native forms, wherein the GUID identifies a first native form of a plurality of different native forms stored on a server, the first native form processable by the form processing engine prior to the non-native form being made accessible by end users, wherein each non-native form is associated with a respective workflow;

locating the previously added field in the non-native form;

extracting the GUID that identifies the first native form of the plurality of native forms from the previously added field and form data from data fields of the non-native form;

retrieving, utilizing the GUID, a virtual copy of the first native form identified by the GUID;

populating the virtual copy of the first native form with the form data from the data fields of the non-native form by mapping the data fields of the non-native form with data fields from the native form; and processing the virtual copy of the first native form according to the respective workflow associated with the first non-native form.

16. The computer program product of claim 15, wherein the non-native form comprises a portable document format (PDF) form or a Web form.

17. The computer program product of claim 16, wherein the instructions are further translatable by the processor for:

obtaining or receiving the GUID from a user permitted to access the first native form;

creating the non-visible hidden field in the PDF form; and placing the GUID in the hidden field in the PDF form to thereby associate the PDF form with the first native form through the GUID in the hidden field in the PDF form.

18. The computer program product of claim 16, wherein the instructions are further translatable by the processor for:

obtaining or receiving the GUID from a user permitted to access the first native form; and embedding the GUID in a form parameter in source code of the Web form to thereby associate the Web form with the first native form through the GUID in the form parameter in the source code of the Web form.

19. The computer program product of claim 15, wherein the instructions are further translatable by the processor for:

responsive to a user instruction to create an editable native form from a non-native form, obtaining source code of the non-native form, parsing the source code to identify fields, extracting the fields and values associated therewith, and creating the editable native form using the fields and values associated therewith thus extracted from the non-native form, the editable native form editable through a form design tool.

20. The computer program product of claim 15, wherein the instructions are further translatable by the processor for:

responsive to a user instruction to create a Web form from a published native form, obtaining fields in the published native form without formatting information, generating source code of the Web form using the fields obtained from the published native form, and presenting the source code of the Web form through a user interface on a user device.

* * * * *